United States Patent

[11] 3,625,414

[72] Inventor Robert J. Caiola
Fort Wayne, Ind.
[21] Appl. No. 868,554
[22] Filed Oct. 22, 1969
[45] Patented Dec. 7, 1971
[73] Assignee The Dow Chemical Company
Midland, Mich.
Continuation-in-part of application Ser. No. 818,817, Apr. 23, 1969. This application Oct. 22, 1969, Ser. No. 868,554

[54] SEALED SURFACE SULFONATED PLASTIC-SHAPED ARTICLES
12 Claims, 2 Drawing Figs.

[52] U.S. Cl. .................................................. 229/62, 156/308
[51] Int. Cl. ..................................................... B65d 33/16
[50] Field of Search ........................................... 156/307, 308; 229/62

[56] References Cited
UNITED STATES PATENTS
2,825,497  3/1958  Aitt ................................ 229/62
3,310,225  3/1967  Hoblit et al. ..................... 229/62
3,357,874  12/1967  Kennedy, Jr. .................... 156/308
3,511,436  5/1970  Kessler ........................... 229/62

Primary Examiner—Reuben Epstein
Attorneys—Griswold and Burdick, M. S. Jenkins and L. J. Dankert ABSTRACT: Shaped articles of thermoplastic organic polymers are sealed at temperatures below the heat distortion temperature of the polymer by (1) sulfonating at least a portion of a surface of a shaped article, (2) treating at least a portion of the sulfonated surface with a liquid which is a nonsolvent for the base polymer and a solvent for sulfonated polymer on the surface, e.g., water, (3) positioning the treated surface against another surface of surface sulfonated shaped article such that the liquid is disposed therebetween and (4) removing the liquid at temperatures below the heat distortion point of the polymer. Soaking the sealed portion of shaped article in a suitable sealing liquid releases the seal without damaging the article.

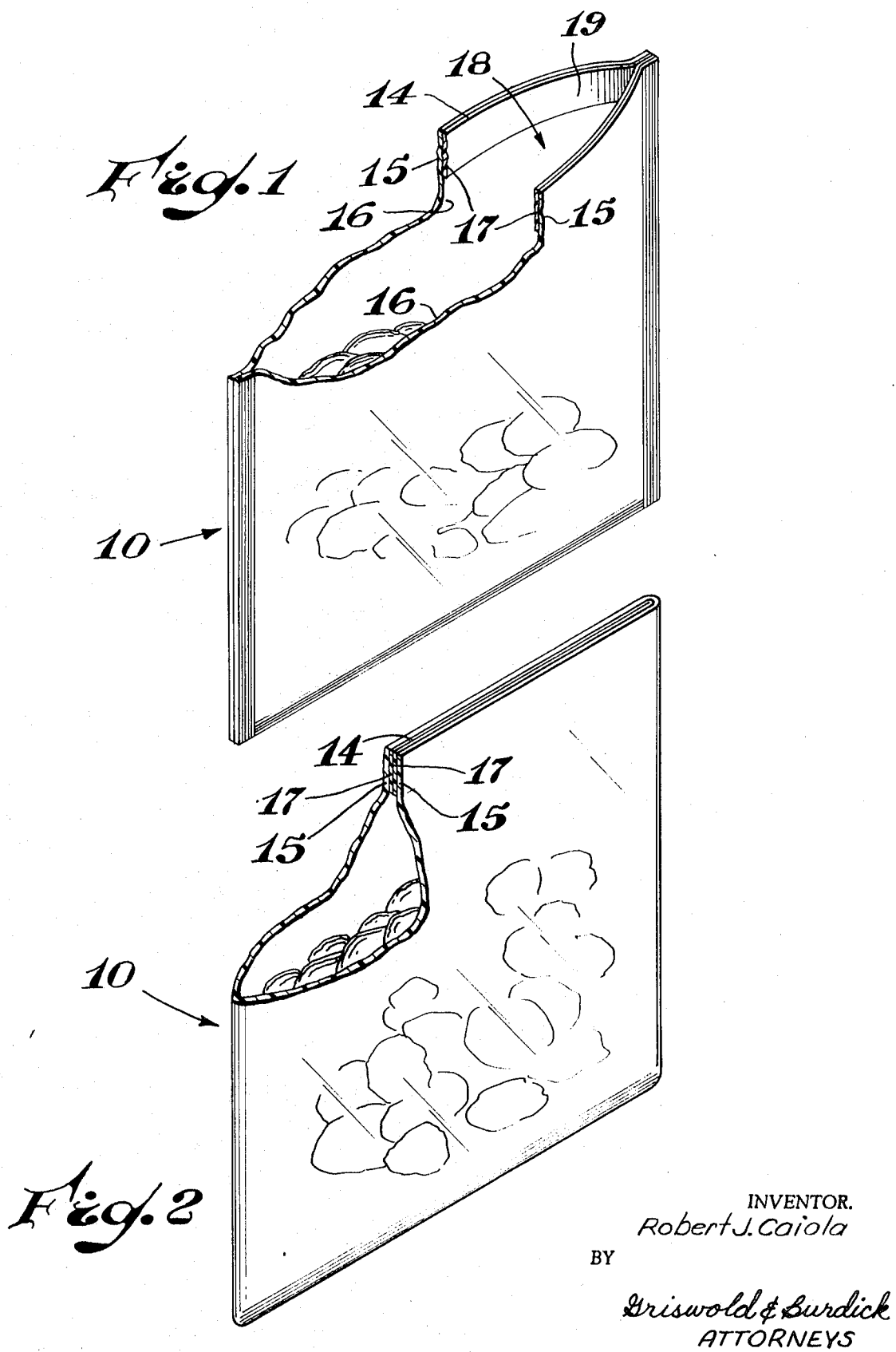

3,625,414

SEALED SURFACE SULFONATED PLASTIC-SHAPED ARTICLES

CROSS-REFERENCE TO RELATED APPLICATIONS

This is a continuation-in-part of application, Ser. No. 818,817 filed Apr. 23, 1969.

BACKGROUND OF THE INVENTION

This invention relates to the art of sealing shaped articles of thermoplastic organic polymers, and more particularly, to a method for sealing such shaped articles at temperatures below the heat distortion point of such polymers.

In various industries, particularly the packaging industry, it is often desirable to seal opposing surfaces of shaped articles of thermoplastic organic polymers together. In order to form seals useful to the packaging art, it has generally been a practice to bond the surfaces o the shaped articles, usually in the form of sheets, to each other using one of two general techniques. According to one technique, an adhesive material is applied to the surfaces of the sheets to be bonded; the sheets are placed in contact; and heat and/or pressure are applied to form a secure bond. In accordance with the second general technique, the surfaces of the sheets are placed in contact with one another and sufficient heat and pressure are applied to melt or soften the thermoplastic material. Both of the above techniques generally require temperatures so high that the resultant seal of thermoplastic polymer has poor esthetic appeal and exhibits degraded function properties or distorted appearance. Such looses in desirable film or sheet properties are often a result of heat shrink. These problems are acute with oriented films or sheets, particularly the biaxially oriented sheets or other shaped articles of styrene polymers. The technique requiring the use of adhesive suffers from the additional problems caused by the effects of the adhesive on the polymer sheet, for example, increased blocking, brittle seals and increased opacity. Furthermore, adhesives which are or include good solvents for the base polymer often produce cracks in the sheet, so-called crazing.

In view of the problems occurring in techniques previously used for sealing shaped articles of thermoplastic organic polymers, it would be highly desirable to provide a tractable method for economically sealing such articles which method requires moderate pressure and temperature below the heat distortion point of the polymer, preferably below temperatures which characteristically cause heat shrink of the shaped article.

SUMMARY OF THE INVENTION

In accordance with the present invention shaped articles of thermoplastic organic polymers are sealed together to form secure, essentially transparent bonds by a method comprising the steps of (1) sulfonating at least a portion of the surface of a shaped article of normally solid, water-insoluble, thermoplastic organic polymer; (2) wetting at least a portion of the sulfonated surface with a liquid which is a nonsolvent for the thermoplastic organic base polymer and a solvent for the sulfonated polymer on the surface; (3) placing the wetted surface in contact with another sulfonated surface of article of normally solid, water-insoluble, thermoplastic organic polymer to form contiguous surfaces with the liquid disposed therebetween; and (4) subsequently removing the liquid while maintaining the resulting contiguous structure. Advantageously the liquid is removed by applying force to cause the contiguous surfaces to press against each other and heating said surfaces until the liquid is vaporized. It is required, however, that the internal temperature of the articles of polymer does not reach the heat distortion point of the polymer. The resultant seals are secure, essentially transparent bonds in which the properties of the surface sulfonated polymer are not deleteriously affected. In addition, such seals are impervious to air and are at least equal in strength to that of the articles being sealed.

The above method for sealing such articles is a reversible one in that the seal may be reopened without destruction or distortion of the shaped articles by soaking the sealed portion in the sealing liquid, as described above and hereinafter in more detail. Following reopening, the sealing operation can be effectively repeated.

Shaped articles of polymers treated in accordance with the method of this invention may be employed in a wide variety of uses, for example, those which require a sealable transparent sheet material, such as a box overwrap in the packaging art. The method of this invention is particularly useful in the production of packages for food, clothing and other articles for which an entirely transparent package is desirable.

BRIEF DESCRIPTION OF THE DRAWINGS

FIG. 1 is a perspective view with a corner removed of an open bag embodying the principles of the invention.

FIG. 2 is a perspective view with a corner removed of a bag similar to the bag illustrated in FIG. 1 when the bag is sealed.

DESCRIPTION OF THE PREFERRED EMBODIMENTS

Shaped articles sealed in the practice of this invention are fabricated from normally solid, water-insoluble thermoplastic organic polymers. Suitable examples are polymers of the following monomers: the monoolefins and conjugated diolefins, e.g., ethylene, propylene, butene-1, isobutene, 1,3-butadiene, isoprene and other aliphatic mono- and diolefins; the halogen substituted olefins, e.g., vinyl chloride, vinylidene chloride and the like; the monovinylidene aromatic compounds, e.g., styrene, $\alpha$-methylstyrene, ar-methylstyrene, chlorostyrene and other aromatic olefins; the unsaturated carboxylic acid esters including the esters of $\alpha,\beta$-ethylenically unsaturated carboxylic acids such as ethyl acrylate, methyl methacrylate, butyl acrylate, propyl itaconate, isobutyl acrylate, ethyl maleate, methyl fumarate, etc., and the unsaturated esters of saturated carboxylic acids such as vinyl acetate, vinyl propionate, vinyl butyrate, 2-propenyl acetate, and the like; the $\alpha,\beta$-ethylenically unsaturated carboxylic acids, e.g., acrylic acid, methacrylic acid, maleic acid and anhydride, fumaric acid, itaconic acid, and the like; and other vinyl compounds, e.g., acrylonitrile, acrylamide, methyl vinyl ether and the like. Also included are the polyamides such as nylon, chlorinated polyolefins such as chlorinated polyethylene, polyethylene terephthalate, and the like. Of particular interest in the practice of this invention are polyethylenes, ethylene/vinyl acetate copolymers, ethylene/ethyl acrylate copolymers, ethylene/acrylic acid copolymers, ethlene/iso-butyl acrylate copolymers, polypropylenes, ethylene/propylene copolymers, propylene/butene-1 copolymers, polyvinyl chloride, vinyl chloride copolymers, vinylidene chloride/acrylonitrile copolymers, vinylidene chloride/vinyl chloride copolymers, copolymers of vinylidene chloride with acrylic acid, methacrylic acid or their ester derivatives, polystyrene, styrene/1,3-butadiene copolymers, nylon, chlorinated polyethylenes, polyethylene terephthalate and the like. Preparation of such polymers is well known to those skilled in the art, and therefore is not described.

By the term "shaped article" is meant various fabricated articles including sheets, films, fibers, foils, filaments, yarns, threads, ribbons, tapes, moldings and the like. Such shaped articles also include containers made of flexible plastic sheet or film such as bags, pouches, packets, tubes and other similar flexible enclosures and also containers made of more rigid plastic materials such as cups, troughs, bowls and the like having their open areas sealed off from the atmosphere with flexible plastic sheet or more rigid lids or coverings. Processes for fabricating such shaped articles from the above-described polymers include extrusion, compression and injection molding and the other conventional techniques. Shaped articles preferably utilized are sheets or films fabricated by extruding the polymer through an annular die, blowing the extruded tube into the form of a bubble or tube having a wall of the desired thickness, cooling, collapsing and cutting the resulting biaxially oriented sheet into the desired dimensions. Alternatively the sheet or film is prepared by extrusion through a slit die followed by stretching the film to give desired orientation. Typical surface sulfonated sheets of polymer have thicknesses ranging from about 0.3 to about 20 mils. Such films and sheets are particularly useful in the manufacture of bags, pouches, envelopes and other similar enclosures.

A shaped article of this invention has at least a portion of its surface adapted to be sealed to itself or to another similarly adapted polymer surface by wetting said portion with a suitable liquid, hereinafter described in more detail; placing the wetted portion in contact with a similarly adapted surface to provide contiguous surfaces with the liquid disposed therebetween; and subsequently removing the liquid at temperatures below the heat distortion point of the polymer of the shaped article while maintaining the resulting contiguous structure. For the purposes of this invention an adapted surface is a surface of sulfonated normally solid, thermoplastic organic polymer. A particularly desirable shaped article embodying the principles of this invention is a flexible plastic bag wherein at least the portion of the lining surface of the bag proximate to and about the periphery of the bag mouth or opening has a suitable concentration of sulfur trioxide equivalents as hereinafter defined.

Referring now to the drawings, FIG. 1 illustrates a bag 10 embodying the principles of the invention, which bag 10 comprises two rectangular sheets 15 of flexible plastic material superimposed on one another and attached along six of their eight edges with the unattached edges of the two sheets defining an opening 18 through which the bag 10 can be filled. Laminated to the portion of the lining surfaces 16 of the bag 10 proximate to and about the periphery of the bag opening 18 is a strip of surface sulfonated normally solid, thermoplastic organic polymer, preferably surface sulfonated polystyrene. It is understood that lamination of the strip 17 to the portion of the lining surface 16 can be effected by any of several conventional techniques, e.g., use of an adhesive material, heat sealing and the like. Alternatively, said strip 17 is laminated to said portion of the lining surface 16 by the method of this invention.

In practicing the method of this invention on this embodiment of the invention, the surfaces 19 of the surface sulfonated strip 17 are moistened with water or other suitable liquid and then pressed together until essentially all of the water or other liquid is removed from the resulting interface. FIG. 2 illustrates the bag 10 sealed along the resulting interface 14. The other numbered components are the same as in FIG. 1.

Similar embodiments of this invention are bags or similar enclosures with their entire lining surfaces being sulfonated in which case portions of the lining surfaces proxminate to and about the periphery of the bag or enclosure opening are wetted and sealed by the method of this invention. Also similar are bags or similar enclosures wherein only the portions of their lining surfaces proximate to and about the periphery of their openings are surface sulfonated. Yet another embodiment is a bag or an envelope having an (a) extending flap, a portion of which is surface sulfonated, and (b) an exterior surface with a surface sulfonated portion such that when the extending flap is folded to enclose the contents of the bag or envelope the sulfonated portions of the flap and exterior surface are contiguous.

Containers embodying the principles of this invention are particularly suitable as containers for garbage or other waste matter, oleaginous foods, other oleaginous materials and the like.

Surface sulfonation of the shaped article is effected by one of several methods commonly used in surface sulfonating polymers. For example, the surface of the shaped article or the polymer prior to shaping is subjected to the action of a sulfonating reagent such as concentrated sulfuric acid, usually containing at least 80 weight percent of sulfuric acid, gaseous sulfur trioxide, or a liquid solution of sulfur trioxide in an inert solvent such as aliphatic hydrocarbons and halogenated aliphatic hydrocarbons, e.g., methylene chloride, chloroform, pentane, hexane and the like. It is understood that surface sulfonation may be suitably carried out by contacting said surfaces with oleum, anhydrous solutions of oleum and free sulfur trioxide, aliphatic hydrocarbons containing chlorosulfonic acid and the like. More complete descriptions of suitable surface sulfonation processes are set forth in U.S. Pat. Nos. 2,832,698 and 2,937,066.

A satisfactory degree of surface sulfonation is that amount which imparts the required polar characteristics to the surface of the article, but does not physically degrade the article. In most embodiments the surface sulfonated articles preferably have from about 0.04 to about 100 micrograms of sulfur trioxide equivalents per square centimeter of surface. Especially preferred surface sulfonated articles have from about 0.10 to about 3.0 micrograms of sulfur trioxide equivalents per square centimeter. A satisfactory degree of surface sulfonation is obtained by carrying out the sulfonation process at temperatures between the freezing point of the sulfonating reagent and about 150° C. for periods of time ranging from a matter of seconds, or even almost instantaneous periods involving mere fractions of a second, to hours.

It is understood that only the portion of shaped article surface which is to be sealed needs to be surface sulfonated. Thus, surface sulfonation techniques for sulfonating only a portion of shaped article surface are suitable. It is also understood that the sulfur trioxide groups may be in the form of —$SO_3H$ or —$SO_3^{\ominus} \oplus M$ wherein M is a cation such as an alkali metal, an alkaline earth metal and the like.

Liquids which effectively lower the temperatures required to seal the surface sulfonated article, but which do not adversely affect the article's physical characteristics are liquids which are nonsolvents for the thermoplastic organic base polymer and which are solvents for the sulfonated polymer on the surface. Generally, such liquids have solubility parameters of at least 12 at 25° C.

Solubility parameter ($\sigma$) of a nonelectrolyte, as defined in Hildebrande and Scott, The Solubility of Nonelectrolytes, 3rd ed., Reinhold Publishing Co., New York, 1949, is determined using the formula: $\sigma = (\Delta E/V)^{1/2}$ wherein $\Delta E$ is the enthalpy of the nonelectrolyte at 25° C. and 760 mm. and V is the molecular volume calculated by dividing density of the nonelectrolyte by its molecular weight. From the teachings of Hildebrande and Scott and others, it is known that nonelectrolytes having approximately equal solubility parameters are generally soluble in one another, whereas nonelectrolytes having substantially different solubility parameters are generally insoluble in one another.

Generally thermoplastic organic polymers, particularly the polymers suitable as the base polymers in this invention, have solubility parameters significantly less than 12, usually from about 8 to about 10 at 25° C. If a liquid having a solubility parameter less than 12 at 25° C. is used to seal the polymer article, the liquid, which is generally a solvent for the polymer, crazes or otherwise deleteriously affects the polymer's physical characteristics. Therefore, it is necessary to use a liquid which is essentially a nonsolvent for the base polymer. Liquids having solubility parameters of at least 12 at 25° C. are generally such nonsolvents. In addition, the sulfonated polymers on the surfaces of the shaped articles generally possess solubility parameters at 13 to 15 or higher. Therefore the liquid, in order to be a solvent for the sulfonated polymer, generally must have a solubility parameter of at least 12 at 25° C.

Preferred liquids are generally low boiling liquids such as water and dilute aqueous solutions of volatile acids and bases. It is understood that dilute solutions of nonvolatile bases may also be employed; but, if such nonvolatile bases are employed, it is desirable to use only an amount of nonvolatile sufficient to neutralize the sulfonic acid group or to wash away any excess base that remains. Also preferred are the aliphatic alcohols, methanol and ethanol. The low boiling character of the preferred liquids facilitates rapid removal of liquid from the surface of the shaped article, thereby effecting a quick seal at temperatures substantially below the heat distortion point of the polymer.

Operable liquids include N,N-dimethylformamide, N-methylformamide, dimethyl sulfoxide, diethylsulfone and the like. These operable liquids have somewhat higher boiling points and are believed to leave the surface of For shaped article by migrating into the inner portion of the shaped article. Such migration sometimes causes a slight haziness in the resulting seal.

In carrying out the method of this invention, a suitable liquid is advantageously applied to a surface of the surface sulfonated shaped article using any conventional technique. For example, the surface sulfonated article is easily wetted with such liquids by rolling, dipping, spraying, brushing, wicking and the like. It is understood that only portion of the article surface where sealing is desired needs to be contacted with the liquid. Furthermore, it is only required that the liquid be applied in a manner such that the portion of article surface is barely moistened or wetted with the liquid. However, it is generally preferred to apply an essentially continuous layer of liquid to the portion of article surfaced to be sealed.

Following the application of liquid and before the liquid evaporates from the article surface, the wetted surface is placed in contact with another surface of a surface sulfonated shaped article, which surface may be dry or wetted with a suitable liquid. The surfaces of shaped article or shaped articles are contiguous with the liquid disposed therebetween.

The articles are then sealed together by maintaining the contiguous structure and subjecting the structure to temperatures ranging from about room temperature to about 120° C. until essentially all of the liquid is removed from the contiguous surfaces, provided however, that internal temperature of the polymer article does not reach the heat distortion temperature of said polymer. Times required to remove the liquid vary with the temperatures used and the properties of the liquid; usually if the articles are sealed at room temperature about 4 to 16 hours is required, and if sealed at temperatures from about 65° to about 100°C., from 1 minute to 10 minutes is required.

The following examples are given to illustrate the invention and should not be construed as limiting its scope. In addition, all parts and percentages are by weight unless otherwise indicated.

EXAMPLE 1

A polystyrene film having thickness of 3 mils is surface sulfonated to a degree of 0.8 microgram of sulfur trioxide equivalents/cm$^2$ by contacting the film surface with gaseous sulfur trioxide. A portion of the sulfonated portion is wetted with water and a second portion of the sulfonated surface is brought into contact with the wetted surface. THe wetted surface is readily bonded to the second portion with a "Sentinel" heat sealer manufactured by Packaging Industries, Montclair, N.J.

The contacting surfaces of the film are sealed together at jaw pressure of 40 p.s.i. at 80°–90° C. in a time of 1 minute. The resultant seal is transparent and the film tears before the seal is broken. In addition, the sealed film exhibits no cracks, brittleness, distortion or heat shrinkage as a result of the sealing operation. Equivalent seals are obtained using the same pressure means at 65° C. for 10 minutes. Such seals are also obtained at room temperature overnight by maintaining contact, but without using pressure.

The sealed portion is placed in a vessel of water at room temperature for 10 minutes. Upon removal of the sealed portion from the vessel, the pieces of film are separated without tearing or otherwise distorting the film.

The sealing operation described above is then repeated with the same pieces of film to provide a seal which cannot be broken without tearing the film.

EXAMPLES 2–6

The procedures of example 1 are repeated using different liquids for sealing the film described in example 1. The results are shown in table I.

TABLE I

| Example No. | Liquid | Seal [1] |
| --- | --- | --- |
| 2 | Methanol | Good |
| 3 | Ethanol | Good |
| 4 | Dilute Hydrochloric Acid | Good |
| 5 | Dimethyl Sulfoxide | Good [2] |
| 6 | Dimethyl Formamide | Good [2] |

[1] Good = film tears before seal is broken.

[2] A slight haziness occurs in the sealed portion when the film is sealed at 80°–90° C., but does not occur when the sealing operation is carried out at room temperature.

When solvents for polystyrene such as benzene, toluene and the like are used in the procedure of example 1, the resultant seals are very weak, i.e., pull apart without tearing the film, and the sealed portions are noticeably weakened, crazed and distorted.

EXAMPLES 8–16

The sealing procedure of example 1 is substantially repeated to seal different surface sulfonated polymer films, except that a jaw temperature of 85° C. and a sealing period of 2 minutes is used. The results are shown in table II.

TABLE II

| Ex. No. | Polymer | Film Thickness, mil | Degree of sulfonation, microgram/cm.$^2$ | Seal ([1]) |
| --- | --- | --- | --- | --- |
| 8 | Polystyrene | 2.5 | 0.12 | Good. |
| 9 | do | 1 | 0.33 | Do. |
| 10 | do | 5 | 0.45 | Do. |
| 11 | Polyethylene | 1 | 0.45 | Fair. |
| 12 | do | 1 | 2.2 | Good. |
| 13 | Vinylidene chloride/vinyl chloride copolymer. | 1.8 | 0.13 | Do. |
| 14 | Polypropylene | 1 | 0.17 | Fair. |
| 15 | Ethylene/vinyl acetate copolymer. | 0.5 | 0.16 | Good. |
| 16 | Polyethylene terephthalate | 1 | 0.15 | Do. |

[1] Good = seal is not broken without distorting the film; Fair = strength of seal is slightly less than the tensile strength of the film.

Good seals are also observed between the following different surface sulfonated films:
polystyrene to polypropylene,
polystyrene to vinylidene chloride/vinyl chloride copolymer,
ethylene/vinyl acetate to polyethylene terephthalate,
and others when sealed in accordance with the method of this invention.

EXAMPLE 17

A 1-inch strip of biaxially oriented 3 mil polystyrene film is surface sulfonated on one side to a degree of 1.04 micrograms of sulfur trioxide equivalents/square centimeter of surface. The sulfonated strip is laminated proximate to and about periphery of the mouth of a bag of flexible polyethylene sheet by applying a layer of polyvinyl acetate to the nonsulfonated side of the sulfonated strip and pressing the adhesive coated side of the strip against the portion of lining surface of the bag proximate to and about the opening of the bag. The sulfonated strip on one side of the bag is then bonded to the sulfonated strip on the opposing side of the bag by following the procedure described in example 1.

What is claimed is:

1. A plastic bag of a flexible thermoplastic organic polymer, said bag having an opening, the inner surface of said bag proximate to and about the periphery of said opening being surface sulfonated with gaseous sulfur trioxide such that said surface has from about 0.04 to about 100 micrograms of sulfur trioxide equivalents per square centimeter, said surface capable of being sealed to a similar sulfonated surface by wetting at least one of said surfaces with water and removing the water at temperature below the heat distortion point of the polymer while said surfaces are in contact with one another.

2. A plastic container of an organic polymer, said container having an opening, the surface of said container proximate to and about the periphery of said opening being surface sulfonated such that said surface has from about 0.04 to about 100 micrograms of sulfur trioxide equivalents per square centimeter, said surface capable of being sealed to a similar sulfonated surface by wetting said surfaces with water and removing the water at temperature below the heat distortion point of the polymer while said surfaces are in contact with one another.

3. The container according to claim 2 wherein the polymer is a polymer of a monovinylidene aromatic compound.

4. The container according to claim 3 wherein the monovinylidene aromatic compound is styrene.

5. The container according to claim 2 wherein the polymer of monovinylidene aromatic compound is polystyrene.

6. The container according to claim 2 wherein the polymer is a polymer of an aliphatic monoolefin.

7. The container according to claim 6 wherein the polymer is polyethylene.

8. The container according to claim 6 wherein the polymer is polypropylene.

9. The container according to claim 6 wherein the polymer is ethylene/vinyl acetate copolymer.

10. The container according to claim 2 wherein the polymer is a polymer of a halogen substituted olefin.

11. The container according to claim 10 wherein the halogen substituted olefin is a vinyl chloride/vinylidene chloride copolymer.

12. A closed plastic container of an organic polymer, said container having at least two surfaces of sulfonated polymer containing from about 0.04 to 100 micrograms of sulfur trioxide equivalents per square centimeter, said surfaces having been sealed together to close said container by first wetting at least one of said surfaces with a liquid which is a nonsolvent for the polymer and a solvent for the sulfonated polymer, placing the wetted surface in contact with said other surface and subsequently removing the liquid while maintaining the resulting contiguous structure.

* * * * *

PO-1050
(5/69)

UNITED STATES PATENT OFFICE
CERTIFICATE OF CORRECTION

Patent No. 3,625,414     Dated December 7, 1971

Inventor(s) Robert J. Caiola

It is certified that error appears in the above-identified patent and that said Letters Patent are hereby corrected as shown below:

In column 1, line 18, delete "o" and insert --of--.

In column 5, line 9, delete "For" and insert --the--; in line 18 insert --the-- between "only" and "portion".

In column 6, line 66, insert --the-- after "about".

In the Reference Cited change "Aitt" to --Hitt--.

Signed and sealed this 20th day of June 1972.

(SEAL)
Attest:

EDWARD M. FLETCHER, JR.
Attesting Officer

ROBERT GOTTSCHALK
Commissioner of Patents